(12) United States Patent
Peterson et al.

(10) Patent No.: US 9,860,957 B1
(45) Date of Patent: Jan. 2, 2018

(54) CCT TUNING DAYLIGHTING SYSTEM AND METHOD BASED ON LUMINOSITY MEASUREMENTS

(71) Applicants: Emily Peterson, Beverly, MA (US); Helmar Adler, Danvers, MA (US)

(72) Inventors: Emily Peterson, Beverly, MA (US); Helmar Adler, Danvers, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/352,731

(22) Filed: Nov. 16, 2016

(51) Int. Cl.
*H05B 37/02* (2006.01)
*H05B 33/08* (2006.01)

(52) U.S. Cl.
CPC ..... *H05B 33/0872* (2013.01); *H05B 33/0848* (2013.01); *H05B 33/0854* (2013.01); *H05B 33/0866* (2013.01); *H05B 37/0227* (2013.01)

(58) Field of Classification Search
CPC ............ H05B 37/0218; H05B 37/0227; H05B 37/0245; H05B 37/0281
USPC ................................................. 315/308, 312
See application file for complete search history.

(56) References Cited

U.S. PATENT DOCUMENTS

| | | | |
|---|---|---|---|
| 9,125,257 B2 | 9/2015 | Eisele et al. | |
| 2012/0306380 A1 | 12/2012 | Adler | |
| 2014/0268790 A1* | 9/2014 | Chobot | F21V 23/0464 362/276 |
| 2014/0320024 A1 | 10/2014 | Adler | |
| 2015/0359061 A1 | 12/2015 | Adler | |
| 2016/0286616 A1* | 9/2016 | van de Ven | H05B 33/0842 |
| 2017/0003011 A1* | 1/2017 | Ott | G01J 5/041 |

* cited by examiner

*Primary Examiner* — Tung X Le
(74) *Attorney, Agent, or Firm* — Edwards S. Podszus

(57) ABSTRACT

Systems and methods of adjusting a correlated color temperature (CCT) of a color-tunable light source based on one or more luminosity (lux) sensors, and without a CCT sensor, comprise receiving, at a controller, one or more signals from one or more lux sensors, the one or more signals representative of a luminous flux of natural light; determining, with the controller, a CCT of the natural light based on, at least in part, the luminous flux of the natural light; and transmitting an output signal from the controller based, at least in part, on the determined CCT of the natural light, the output signal configured to control the CCT of the color-tunable light source.

21 Claims, 15 Drawing Sheets

CCT TUNING DAYLIGHTING SYSTEM AND METHOD BASED ON LUMINOSITY MEASUREMENTS

CROSS REFERENCE TO RELATED APPLICATIONS

N/A

FIELD

The present disclosure relates to daylighting systems and methods that utilize one or more color tunable light sources, and more specifically, to daylighting systems and method that determine the correlated color temperature (CCT) of natural daylight without the use a CCT sensor.

BACKGROUND

The use and provision of daylight (daylighting) is becoming of increasing concern to architects and building engineers. Daylight can enhance the appearance of interior spaces, and can provide building occupants with social and psychological benefits. In addition, daylight can be used as a substitute or supplement to artificial lighting, which may reduce the overall energy usage of a building and impart substantial savings to building owners/occupants.

Traditionally, windows have been used as the primary mechanism for admitting daylight to the interior of a building. While windows can admit a great deal of light into an interior space, their usefulness for daylighting is limited by several factors. For example, windows can cause substantial solar heating of building interior spaces, particularly when used in large numbers. This can cause discomfort to building occupants, and may increase the load on air conditioning systems used to control the temperature of interior spaces in the building. Further, windows may not enable natural light to penetrate to all interior spaces of a building, particularly those interior spaces that are remote from the exterior walls of the building. Due to the limited applicability of windows, solar tubes (also known light tubes, light pipes, or daylight pipes) are used in many applications. Solar tubes are structures that transport and/or distribute natural light (and optionally artificial light) from one location (e.g., but not limited to, a rooftop) to another location (e.g., but not limited to, an interior location within a structure/building) for the purpose of illumination.

Recently, artificial light sources have been combined with daylight systems. For example, some known daylight harvesting systems 1, FIG. 1A, include a natural light provider 2 (e.g., a window and/or solar tube) for providing natural light 3 in the space/environment 4 from the sun 5, an artificial light source 6 for providing artificial light 7, a luminosity (lux) sensor 8 that measures the luminosity (e.g., brightness) of the light (e.g., the total light and/or the natural light 3) in the space/environment 4, and a controller 9 that adjusts the brightness of the artificial light source 6 in response to the lux sensor 8. As a result, the energy consumption of the artificial light source 6 may be reduced when there is sufficient natural light 3 in the space/environment 4. While these daylight harvesting systems 1 are generally inexpensive and can save energy, they are limited to adjusting the brightness of the artificial light source 6 and cannot adjust the CCT of the artificial light 7 based on changes to the natural lighting 3. As a result, they cannot be used in many applications that require the ability to adjust the CCT of the artificial light 7 based on the conditions of the natural light 3.

The only daylight systems 10 known to the inventors that can adjust the brightness and the CCT of the artificial light source based on the natural lighting are generally illustrated in FIG. 1B. These daylight systems 10 include a natural light provider 2 (e.g., a window and/or solar tube) for providing natural light 3 in the space/environment 4 from the sun 5, a color-tunable light source 11 for providing artificial light 7, a luminosity (lux) sensor 8 that measures the luminosity (e.g., brightness) of the light (e.g., the total light and/or the natural light 3) in the space/environment 4, a CCT sensor 12 that measures the CCT of the natural light 3, and a controller 13 that adjusts the brightness of the artificial light source 6 in response to the lux sensor 8 and adjusts the CCT of the artificial light 7 based on the measured CCT output signal from the CCT sensor 12 to achieve the desired overall lighting conditions in the space/environment 4. While these known daylight systems 10 are generally effective, the need for both a CCT sensor 12 and a lux sensor 8 increases the overall cost and complexity of the daylight system 10.

Accordingly, what is needed is a daylight system and method that can adjust the CCT of an artificial light source (e.g., color-tunable light source) without the need of a CCT sensor. For example, a daylight system and method is needed that can adjust the CCT of an artificial light source based on the luminosity of the only the natural light without the use or need of a CCT sensor. Additionally, a daylight system and method is needed that can adjust the CCT and the brightness of an artificial light source based on the luminosity of the natural light and the total luminosity of the light in the environment without the use or need of a CCT sensor.

DETAILED DESCRIPTION

Figure 1A:
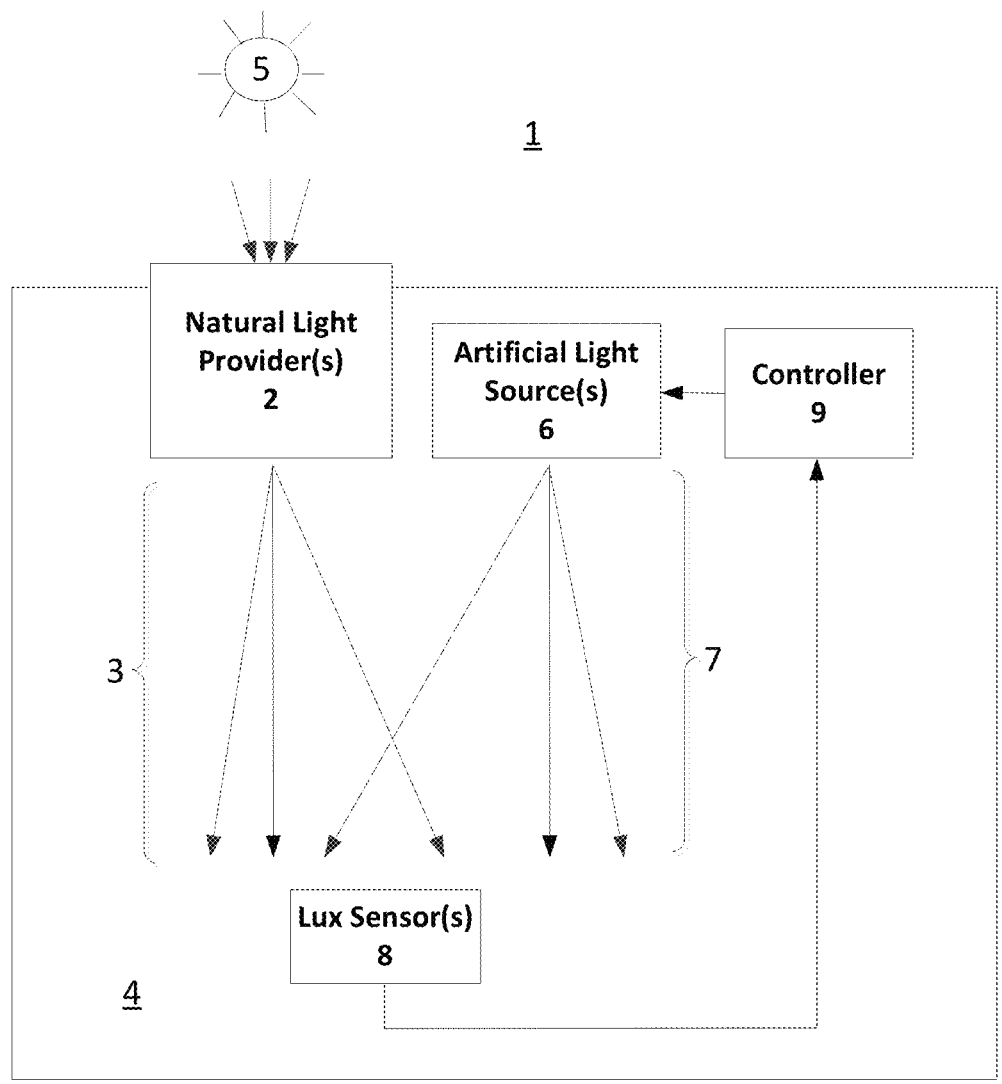
FIG. 1A generally depicts one embodiment of a daylight system according to the prior art.
Figure 1B:
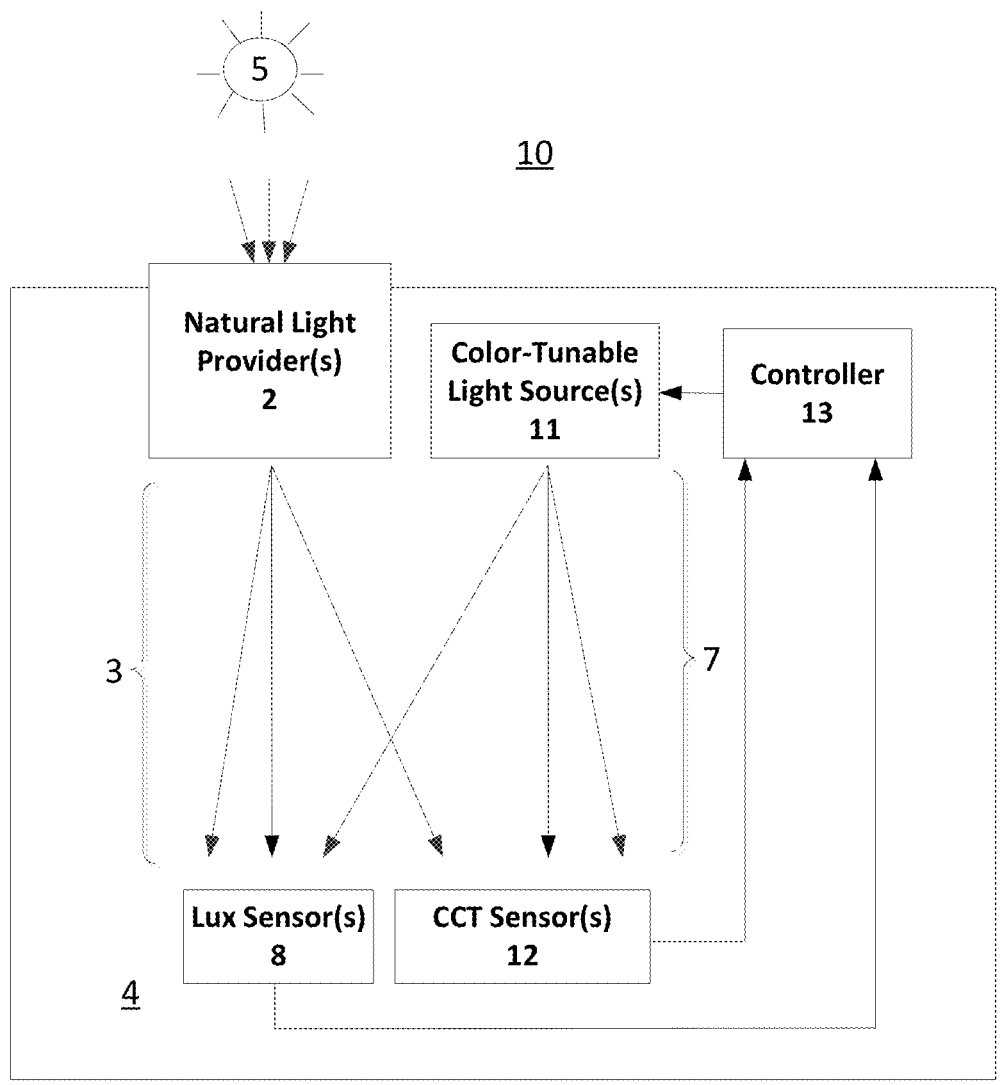
FIG. 1B generally depicts another embodiment of a daylight system according to the prior art.

As used herein, the term "color" is used interchangeably with the term "spectrum." However, the term, "color" generally is used to refer to a property of radiation that is perceivable by an observer (though this usage is not intended to limit the scope of this term). Accordingly, the term "different colors" implies two different spectra with different wavelength components and/or bandwidths. In addition, "color" may be used to refer to white and non-white light.

For the purpose of this disclosure, the term "correlated color temperature," "color temperature," "CCT," or the like refers to the temperature of the Planckian radiator whose perceived color most closely resembles that of a given stimulus at the same brightness and under specified viewing conditions. The color temperature of a radiation sample may be characterized according to the temperature in degrees Kelvin (K) of a black body radiator that radiates essentially the same spectrum as the radiation under examination. Daylight typically has a color temperature which may be classified, for example, using a one or more well-known standards such as, but not limited to, one or more of the standard illuminant series (e.g., A-F) established by the International Commission on Illumination (CIE). As may be appreciated, with lower color temperatures correspond to light having a more significant red component, and higher temperatures correspond to light having a more significant blue component.

The term "correlated color temperature sensor," "color temperature sensor," or "CCT sensor" or the like is used herein to refer to a device that includes a plurality of sensing components/elements that each measure the intensity of a specific band of wavelengths (e.g., channels), wherein the combination of the plurality of bands of wavelengths (e.g., channels) is combined to create an output signal that is directly representative of the CCT of the light source being measured. A CCT sensor may include an array of photodiodes having spectral characteristics calibrated according to the tristimulus values (e.g., as defined by the International Commission on Illumination (CIE)(1931)). For example, a CCT sensor may include three sensing components/elements that measure the intensity of red, green, and blue wavelength bands, respectively. The measured intensity for each of the three sensing components/elements is corrected and the relative values of each of the three sensing components/elements is combined using proper weighting functions to generate an output signal that is directly representative of the CCT of the light source being measure. The plurality of wavelength bands of a CCT sensor extend beyond the wavelength spectrum that is visible to the human eye (e.g., beyond about 390 to 700 nm).

As used herein, the term "artificial light source" is intended to refer to any light source that generates visible light by the flow of electric current. Non-limiting examples of artificial light sources include incandescent lamps, gas-discharge lamps, light emitting diode (LED) lamps, as well as color-tunable light sources (also referred to as a "multi-mode artificial light source").

As used herein, the term "color-tunable light source" is intended to refer to any artificial light source that has at least two selectable colors and/or color temperatures. Such sources include, but are not limited to LED-based sources as defined below, incandescent sources (filament lamps, halogen lamps) with multiple selectable colors and/or color temperatures, fluorescent sources with multiple selectable colors and/or color temperatures (e.g., fluorescent lamps with two or more color temperatures), and high intensity discharge sources (e.g., sodium, mercury, and metal halide lamps) with multiple selectable colors and/or color temperatures. In some embodiments, the color-tunable light sources used herein are capable of exhibiting a wide range of colors and color temperatures, such as the colors in the red, green, blue (RGB) gamut and/or the red, green, blue, and yellow (RGBY) gamut.

As used herein, the terms, "light emitting diode" and "LED" are used interchangeably, and refer to any light emitting diode or other type of carrier injection/junction-based system that is capable of generating radiation in response to an electrical signal. Thus, the term LED includes but is not limited to various semiconductor-based structures that emit light in response to current, light emitting polymers, light emitting strips, electro-luminescent strips, and the like.

In particular, the term LED refers to light emitting diodes of all types (including semi-conductor and organic light emitting diodes), and which may be configured to generate light in all or various portions of one or more of the visible, ultraviolet, and UV spectrum. Non-limiting examples of suitable LEDS that may be used include various types of infrared LEDS, ultraviolet LEDS, red LEDS, green LEDS, blue LEDS, yellow LEDS, amber LEDS, orange LEDS, and white LEDS. Such LEDS may be configured to emit light over a broad spectrum (e.g., the entire visible light spectrum) or a narrow spectrum.

The LED light sources used in the present disclosure may be formed by one or a plurality of individual LEDS. For example, the LED light source may be configured to include a number of individual LEDS that emit different spectra but which, collectively, emit light that is of a desired color (e.g., white, red, blue, green, yellow, orange, amber, etc.) and/or color temperature. An LED may also be associated with one or more phosphors that are an integral part of the LED.

In some embodiments, the artificial light source is a color-tunable light source that includes at least one red (R), green (G) and blue (B) LED, and optionally at least one yellow (Y) LED. The R, G, B, and optionally Y LEDS each emit light in individual regions of the visible spectrum but, collectively, enable the artificial light sources to emit light of any color, including any or a subset of colors in the RGB and/or RGBY gamut. Alternatively or additionally, the lighting systems of the present disclosure may make use of so-called color tunable LEDS, i.e., individual LEDs with adjustable color temperature and optionally adjustable intensity. As a non-limiting example of such color tunable LEDS, mention is made of phosphor converting LEDS.

The term "luminosity sensor," "lux sensor," or the like is used herein to refer to a device that includes one or more sensing components/elements wherein at least one of the sensing components measure(s) the intensity of light within the wavelength spectrum that is visible to the human eye (e.g., visible light is typically about 390 to 700 nm). As is understood to one skilled in the art, a lux sensor generates an output signal that is independent of the CCT within the specified operating parameters (e.g., wavelength/CCT range, temperature range, moisture range, etc) of the lux sensor.

A CCT sensor generates an output signal in which the voltage varies as a function of the CCT of the light being measured. As such, a CCT sensor measuring light having a specific CCT will generate an output signal having the same voltage regardless of whether the luminosity of the light increases or decreases, as long as the CCT of the light being measured does not change. Thus, one cannot directly determine the luminosity of the light being measured based on output voltage of the signal generated by a CCT sensor. In contrast, a lux sensor generates an output signal in which the voltage varies as a function of the luminosity of the light being measured. Accordingly, a lux sensor measuring light having a specific luminosity will generate an output signal having the same voltage regardless of whether the CCT of the light increases or decreases, as long as the luminosity of the light of the light being measured does not change. Thus, while both a CCT sensor and a lux sensor may, at some level, measure the intensity of light, an important distinction between a CCT sensor and a lux sensor is that the output of a CCT sensor represents the CCT of the measured light and does not represent the actual overall intensity of the light.

Reference will now be made in detail to exemplary embodiments of the disclosure, examples of which are illustrated in the accompanying drawings. Wherever possible, the same reference numbers will be used throughout the drawings to refer to the same or like parts.

Figure 2:
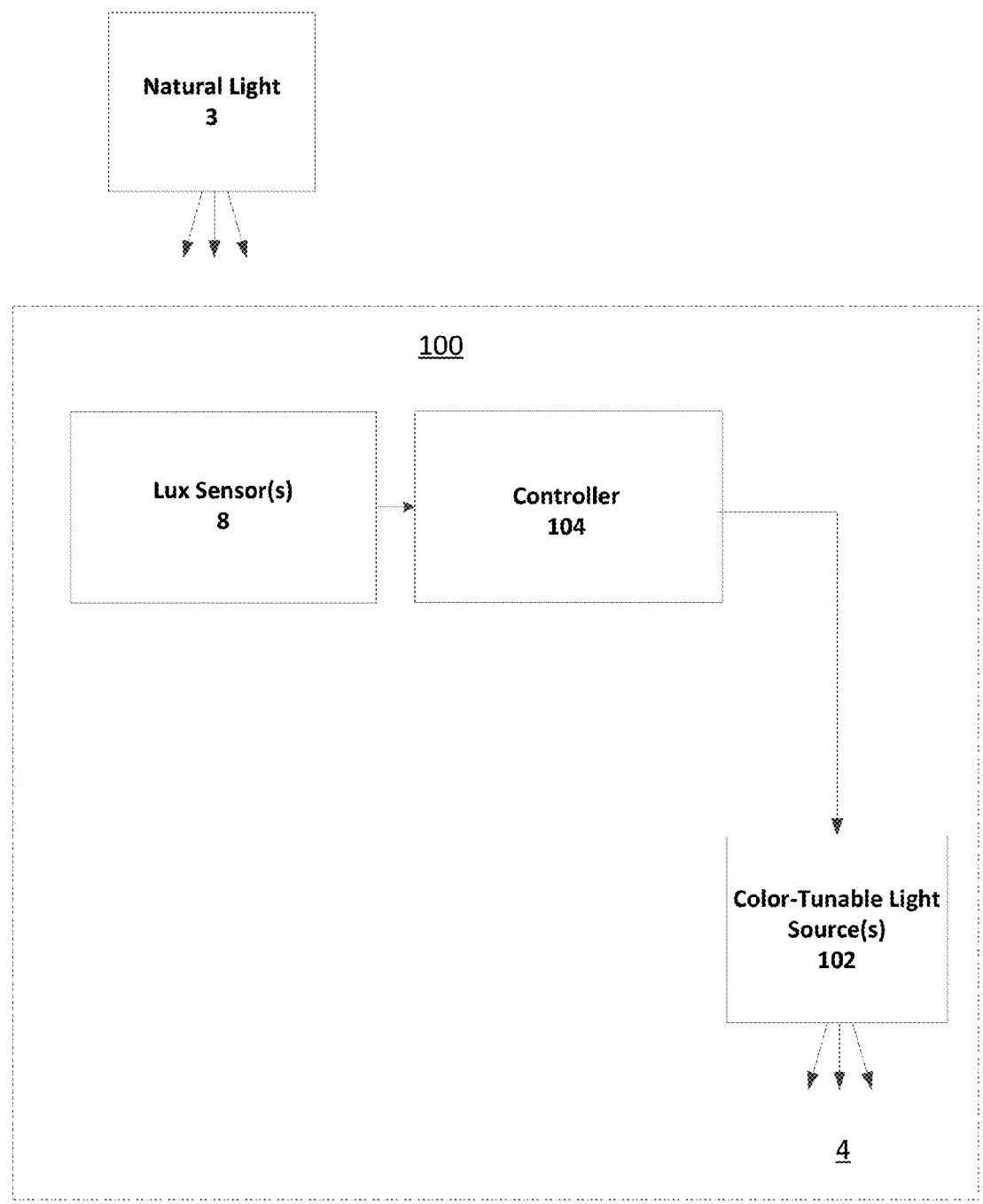
FIG. 2 generally depicts one embodiment of a CCT tuning lighting system in accordance with the present disclosure.

Turning now to FIG. 2, an exemplary correlated color temperature (CCT) tuning lighting system 100 for adjusting (e.g., tuning) the CCT of a color-tunable light source 102 is generally illustrated. The CCT tuning lighting system 100 includes one or more color-tunable light sources 102, at least one color-tunable light source controller 104, and one or more luminosity (lux) sensors 8. The inventors of the present disclosure have discovered that the luminosity of natural light 3 may be correlated to the CCT of the natural light 3. As explained herein, the color-tunable light source controller 104 is configured to receive one or more signals from one or more lux sensors 8 that are representative of a luminous flux of natural light 3, determine a CCT of the natural light 3 based on, at least in part, the determined luminous flux of the natural light 3, and generate an output signal based, at least in part, on the determined CCT of the natural light 3, wherein the output control signal is configured to control the CCT of the color-tunable light source 102.

As such, the color-tunable light source controller 104 can determine the CCT of natural light 3 based on the luminosity of the natural light 3 (e.g., a linear and/or non-linear correlation between the luminosity of the natural light 3 and the CCT of the natural light 3) using one or more lux sensors 8, without (i.e., devoid of) the need for a CCT sensor. The method and system 100 of the present disclosure may therefore reduce the overall cost of the daylight system by eliminating the need for a CCT, thus saving a significant cost and allowing the method and system 100 to be more easily retrofitted to existing systems that already include one or more lux sensors 8. The CCT tuning lighting system 100 is particularly suited for daylight system applications, though this is not a limitation of the present disclosure unless specifically claimed as such and the CCT tuning lighting system 100 may be used in any application in which it is desirable to adjust/tune the CCT of a color-tunable light source based on natural lighting conditions.

Turning now to FIGS. 3-6, various embodiments of the correlated color temperature (CCT) tuning lighting system 100 for adjusting (e.g., tuning) the CCT of a color-tunable light source 102 are generally illustrated. It should be appreciated that one or more of the color-tunable light sources 102, luminosity sensors 8a-n, and/or color-tunable light source controllers 104 illustrated in the various embodiments of FIGS. 3-6 may be combined.

The lux sensors 8a-n may include any lux sensors known to those skilled in the art. For example, the lux sensors 8a-n may include any known ambient light photodetector, an ambient light phototransistor, and/or ambient light photodiode that measures light within the wavelength spectrum that is visible to the human eye (e.g., visible light is typically about 390 to 700 nm). Non-limiting examples of the lux sensors 8 include, but are not limited to, ambient light phototransistor model number SFH 3310 or ambient light photodiode model number SFH 2270R, both of which are commercially available from OSRAM OPTO SEMICONDUCTORS™.

Figure 3:
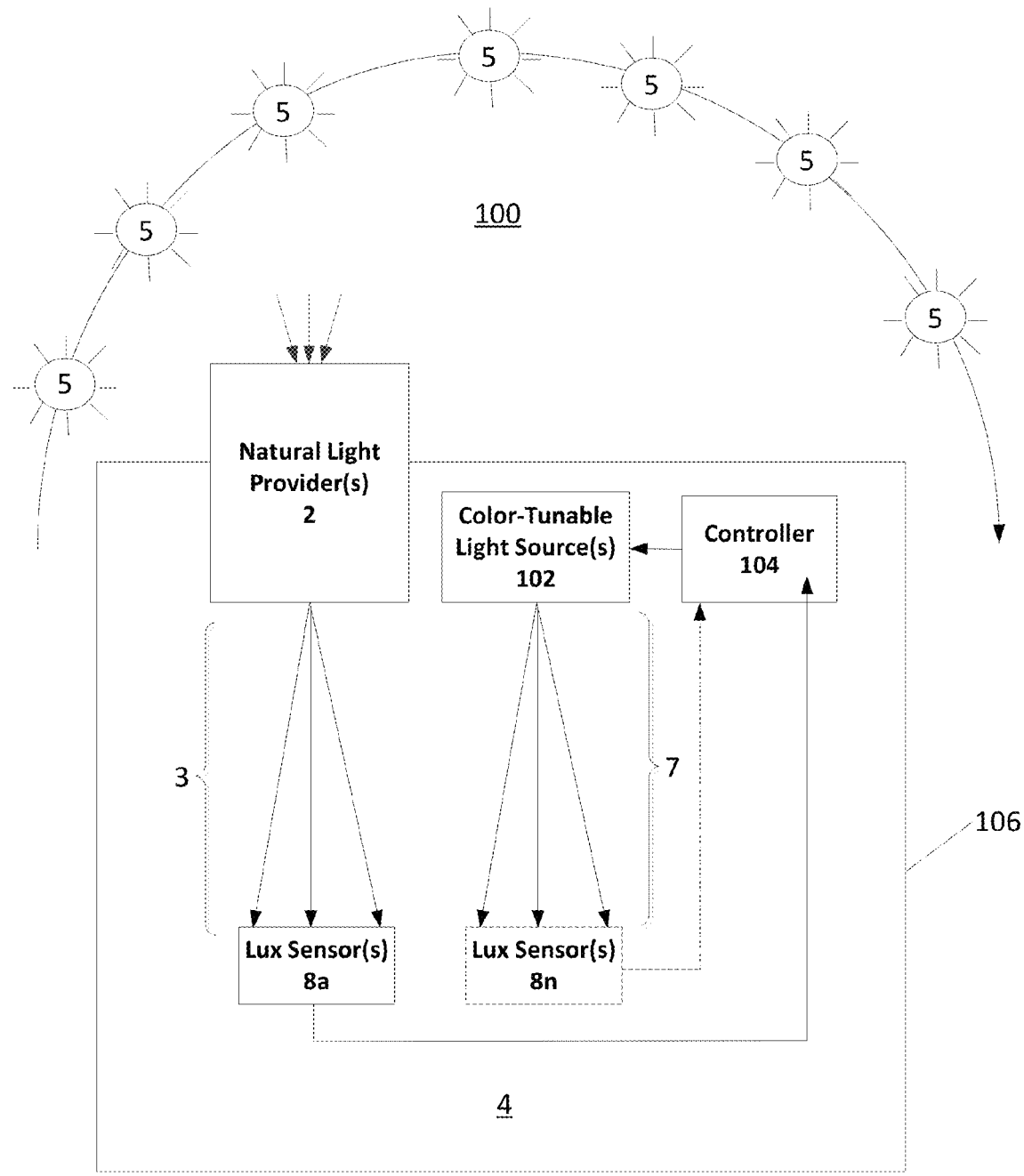
FIG. 3 generally depicts one embodiment of a CCT tuning lighting system having a lux sensor disposed within an illuminated space that directly measures the lux of the natural light, in accordance with the present disclosure.
Figure 4:
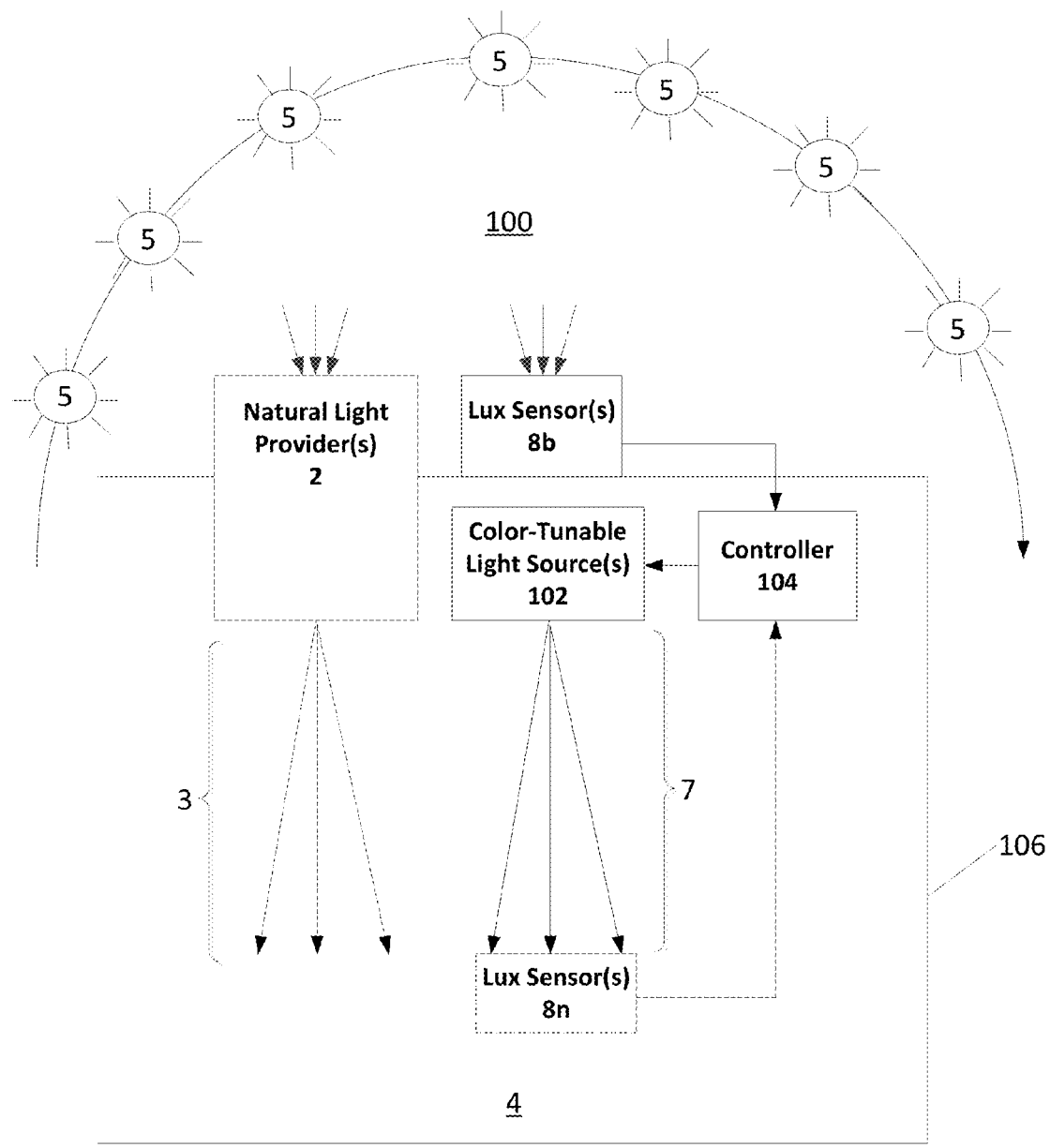
FIG. 4 generally depicts one embodiment of a CCT tuning lighting system having a lux sensor disposed outside of the illuminated space that directly measures the lux of the natural light, in accordance with the present disclosure.
Figure 5:
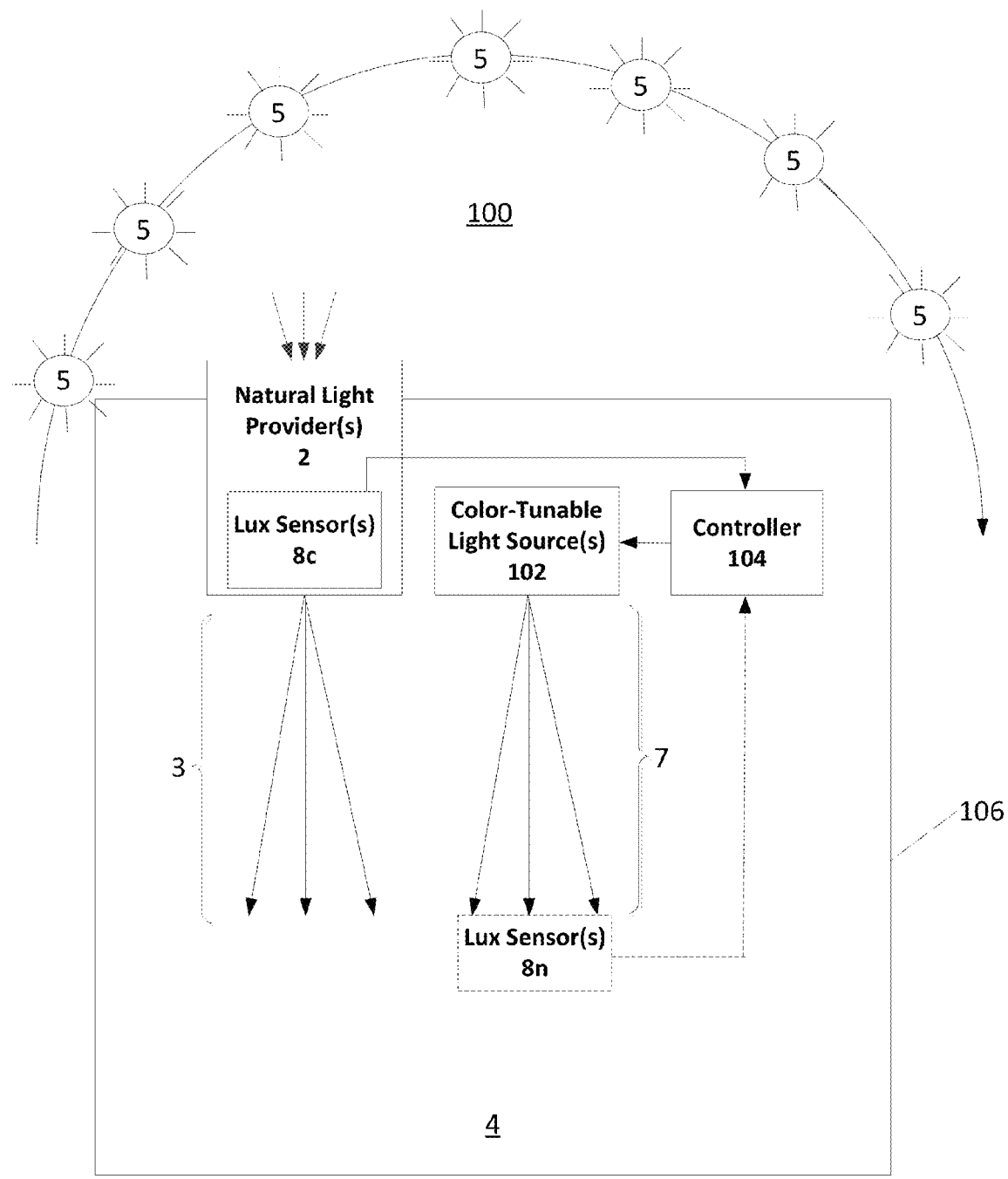
FIG. 5 generally depicts one embodiment of a CCT tuning lighting system having a lux sensor disposed within a natural light provider that directly measures the lux of the natural light, in accordance with the present disclosure.

With reference to FIGS. 3-5, the CCT tuning lighting system 100 includes one or more lux sensors 8a, 8b, 8c (generally referred to as natural light lux sensors 8a-c) that generate an output signal (e.g., voltage) that corresponds to the luminosity of substantially only the natural light 3. As may be appreciated, it may be difficult or impossible to measure the luminosity of only the natural light in many applications due to space constraints, reflection of artificial light, and the like. As such, the phrase "the luminosity of substantially only the natural light" or the like is intended to mean that the natural light accounts for at least 90% of the luminosity measured by the natural light lux sensors 8a-c.

For example, one or more natural light lux sensors 8a, FIG. 3, may be disposed within the environment/space 4 of the structure/building 106 and are configured (e.g., aligned) to measure the luminosity of substantially only the natural light 3 within the environment/space 4. This embodiment may be particularly suited for applications where the natural light provider 2 illuminates a well-defined area that is basically separate from the area illuminated by the color-tunable light sources 102. Alternatively (or in addition), one or more natural light lux sensors 8b, FIG. 4, may be disposed external to the structure/building 106 (e.g., on a roof and/or an external wall surface of the structure/building 106) and/or one or more natural light lux sensors 8c, FIG. 5, may be disposed within the natural light provider 2 (e.g., within and/or on a solar tube and/or on window).

It should be appreciated that while the natural light lux sensors 8a, 8c of FIGS. 3 and 5 are illustrated as being in the same environment/space 4 as the color-tunable light source 102, the natural light lux sensors 8a, 8c may be disposed in a different environment/space 4 (e.g., a different room and/or building) compared to the color-tunable light source 102. Additionally, it may be appreciated that the CCT tuning lighting system 100 of FIG. 4 may optionally include a natural light provider 2. Put another way, the CCT tuning lighting system 100 of FIG. 4 may optionally include only artificial light sources (e.g., color-tunable light source 102) since the natural light lux sensor 8b is measuring the luminosity of the natural light 3 external to the environment/space 4 where the color-tunable light source 102 is illuminating. Moreover, while not a limitation of the present disclosure unless specifically claimed as such, the natural light lux sensors 8*a-c* of FIGS. 3-5 may be part of an existing lighting system that only adjusts the brightness of the artificial light. As such, the CCT tuning lighting system 100 may be installed in retrofit applications in which already include one or more natural light lux sensors 8*a-c*.

Optionally, any one of the embodiments described in FIGS. 3-5 may include one or more lux sensors 8*n* (generally referred to as an artificial light lux sensor 8*n*) configured to measure the luminosity of the artificial light sources (e.g., color-tunable light sources 102). As explained herein, the color-tunable light source controller 104 may optionally adjust the brightness of one or more of the artificial light sources (e.g., color-tunable light sources 102) based, at least in part, on the lux output signal from the artificial light lux sensor 8*n*.

Figure 6:
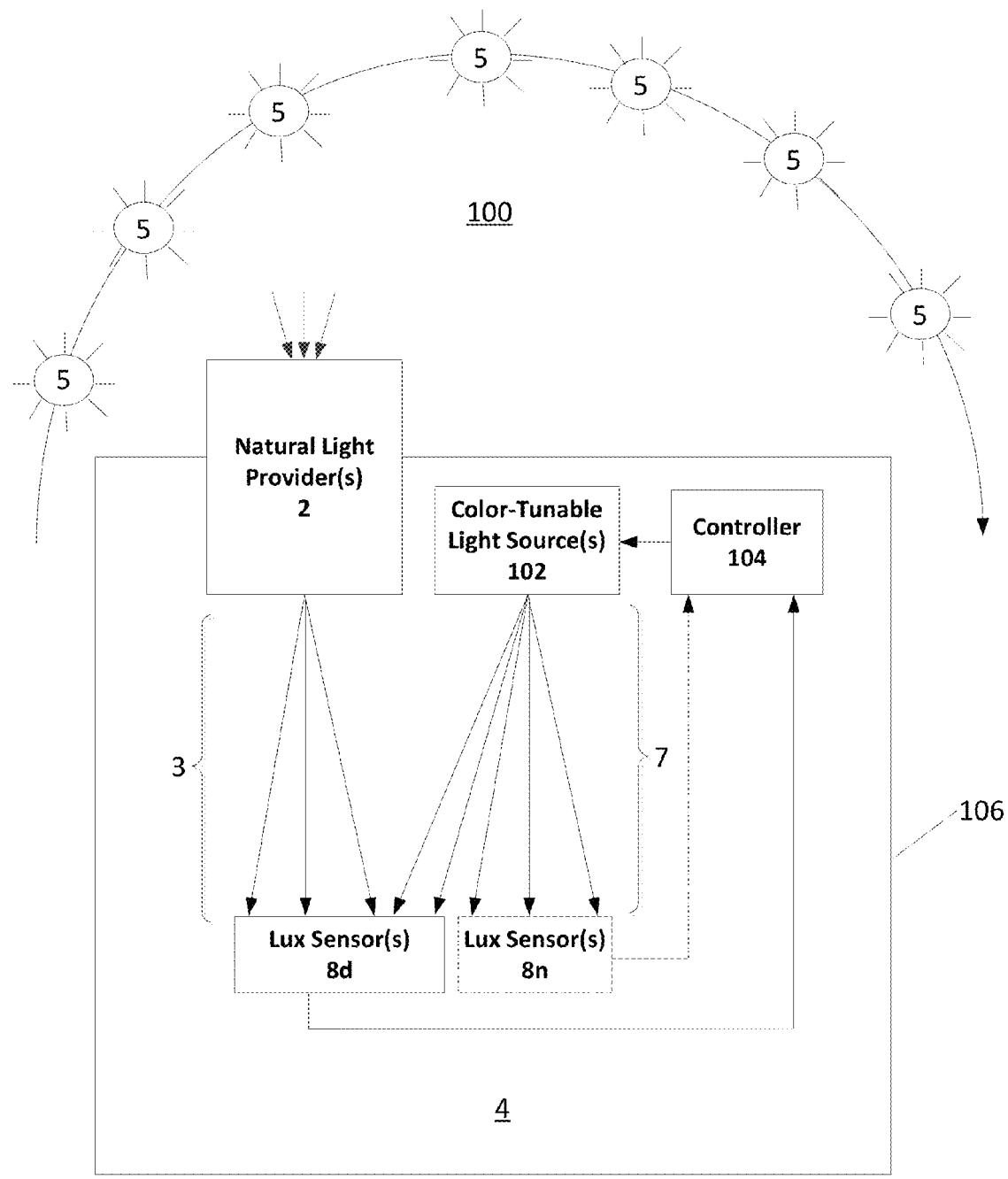
FIG. 6 generally depicts one embodiment of a CCT tuning lighting system having a lux sensor that measures the lux of both the natural light and artificial light, in accordance with the present disclosure.

With reference to FIG. 6, the CCT tuning lighting system 100 may include one or more lux sensors 8*d* (generally referred to as mixed or total light lux sensors) disposed within the environment/space 4 of the structure/building 106 and configured (e.g., aligned) to measure the luminosity of both the natural light 3 and at least some of the artificial light 7 within the environment/space 4 (also referred to as the "mixed luminosity" in environment/space 4). As explained herein, color-tunable light source controller 104 may determine the luminosity of the natural light 3 based on, at least in part, the mixed luminosity from the total light lux sensors 8*d* and a determined luminosity of the artificial light 7.

One way that the color-tunable light source controller 104 may determine the luminous flux of the artificial light 7 in the environment/space 4 is based on a signal from one or more artificial light lux sensors 8*n* that directly measure the luminous flux of the artificial light 7.

Alternatively (or in addition), the color-tunable light source controller 104 may determine the luminous flux of the artificial light 7 in the environment/space 4 based on the power supplied to the artificial light source (e.g., color-tunable light source 120). For example, the color-tunable light source controller 104 may directly or indirectly control the power supplied to the artificial light sources/color-tunable light source 120 (e.g., but not limited to, the voltage, current, and/or switching frequency), and as such, may correlate the power supplied to the artificial light source to the luminosity of the artificial light 7. Alternatively, the color-tunable light source controller 104 may receive a signal from another controller and/or driver circuitry (not shown) associated with the artificial light sources.

Regardless of how the luminosity of the artificial light 7 is determined (e.g., either directly from a signal generated by a lux sensor 8*n* as in FIGS. 3-5 or indirectly from one or more signals generated by artificial light lux sensor 8*n* or indirectly from, e.g., the power supplied to the artificial lights), the color-tunable light source controller 104 may determine the luminous flux of the natural light 3 in the environment/space 4 based, at least in part, on output signal (e.g., voltage) from the lux sensor 8*d* corresponding to the mixed luminosity and the determined luminous flux of the artificial light 7 in the environment/space 4. For example, color-tunable light source controller 104 may subtract the determined luminous flux of the artificial light 7 in the environment from the mixed luminosity generated by the lux sensors 8 to determine the luminosity of the natural light 3.

With reference to FIGS. 2-6, the color-tunable light sources 102 in any of the embodiments described herein may be supplemented with a single mode artificial light sources, e.g., to increase intensity and/or color reproduction over a desired range of the spectrum. As used herein, the term, "single mode artificial light source" refers to a wide range of light sources that exhibit a single color and color temperature. Such sources include, but are not limited to, conventional incandescent, fluorescent, and high intensity discharge sources (e.g., lamps), as well as single mode LED sources (e.g., high intensity white LEDS that do not have an adjustable or selectable color and color temperature).

In some embodiments, the CCT tuning lighting systems 100 described herein may utilize a combination of color-tunable light sources 102 (e.g., color-tunable LED light sources) with fluorescent lamps. For example, the color-tunable light sources 102 described above can be combined with single mode fluorescent lamps, multimode fluorescent lamps, and/or multiple single mode fluorescent lamps that have different color temperatures. In these embodiments, the fluorescent lamps can be dimmed/driven to provide light of a desired intensity, while the LED sources are driven to supply additional color emphasis/shift.

Figure 7A:
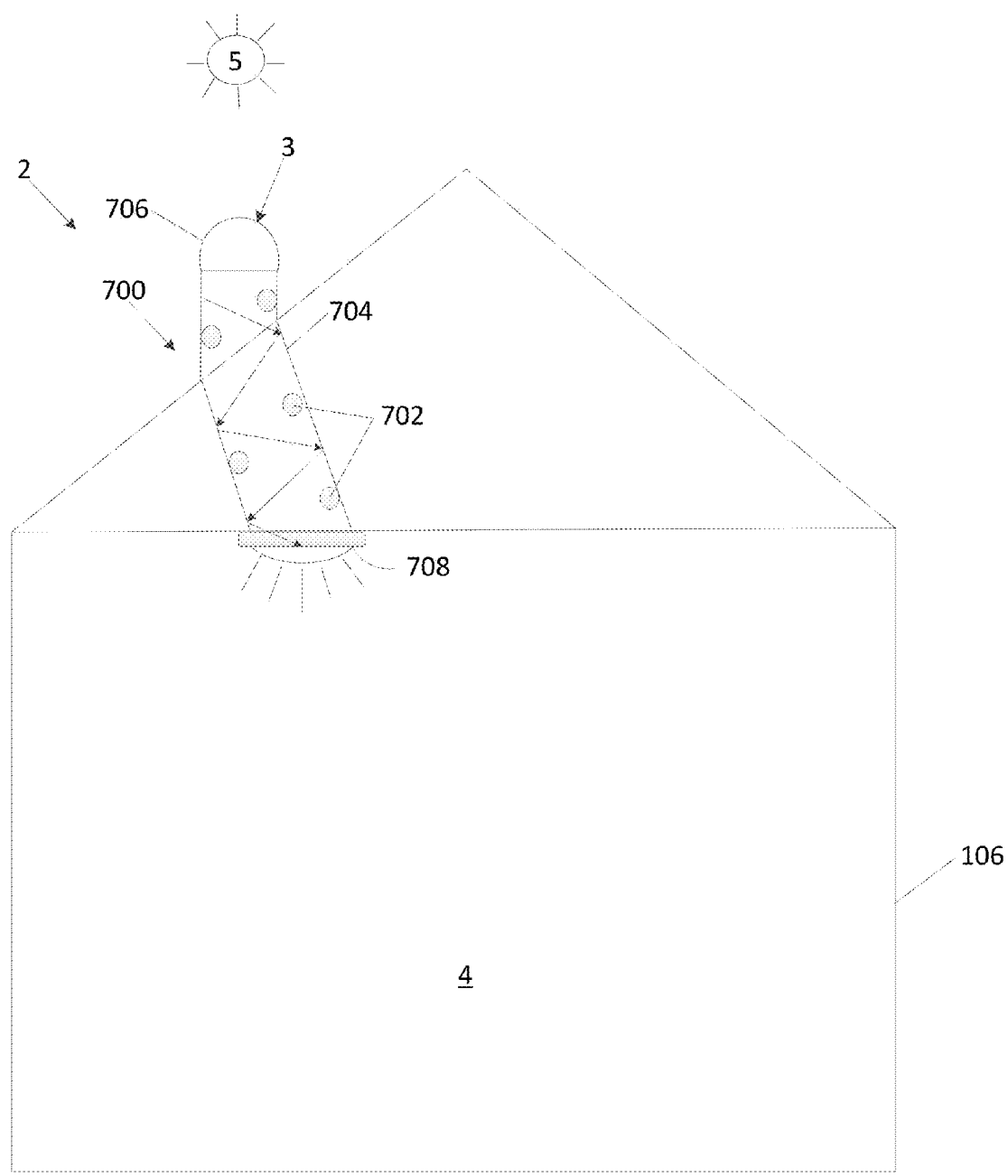
FIG. 7A generally depicts one embodiment of a natural light provider and a color-tunable light source, in accordance with the present disclosure.

Alternatively (or in addition), at least one of the color-tunable light sources 102 described herein may be installed within at least one component of a natural light provider 2 such as, but not limited to, a solar-tube. For example, and as shown in FIG. 7A, the CCT tuning lighting systems 100 may include one or more solar tubes 700 having at least one artificial light source 702 (e.g., a color-tunable light source 102) installed within the interior of an optical conduit 704 of the solar tube 700. Of course, the positioning of the artificial light sources 702 in FIG. 3A is exemplary only, and such sources may be positioned at any suitable location within the solar tube 700, including within the dome 706 and/or the diffuser 708. Moreover, if multiple artificial light sources 702 are used, they may be arranged in any manner within the solar-tube 700. For example, the artificial light sources 702 may be arranged in a geometric (circular, triangular, square, rectangular, etc.) or irregular shape about a circumference of an interior of any of the dome 706, the optical conduit 704, and/or the diffuser 708. Alternatively or additionally, the artificial light sources 702 may be disposed in a random, patterned, and/or non-random, non-patterned fashion.

Figure 7B:
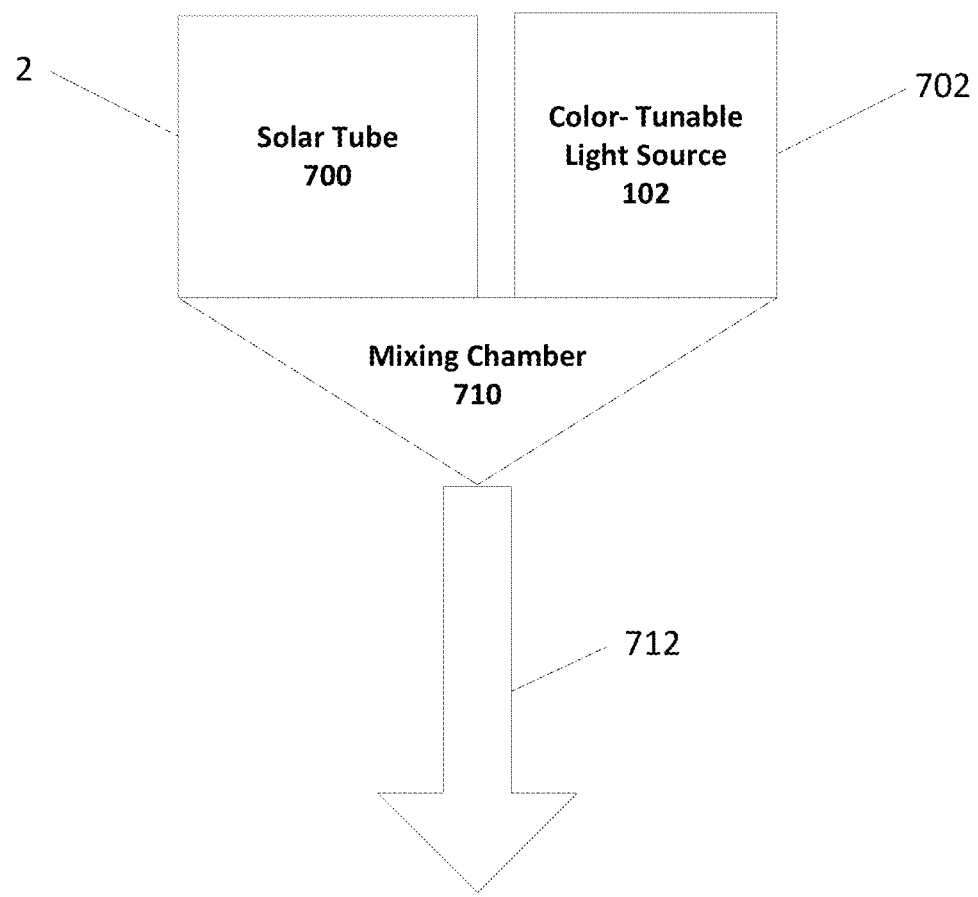
FIG. 7B generally depicts another embodiment of a natural light provider and a color-tunable light source, in accordance with the present disclosure.

In some embodiments, the artificial light sources 702 (e.g., the color-tunable sources 102) are disposed internally and/or externally of a natural light provider 2, and in such a manner that light emitted from the artificial light sources 702 mixes with the natural light 3 supplied by the natural light provider 2. This concept is illustrated generally in FIG. 7B, wherein the artificial light source 702 (in this case a color tunable LED source) is disposed adjacent to a source of daylight, (e.g., but not limited to, a solar tube 700 containing a dome 706, an optical conduit 704, and a diffuser 708 as shown in FIG. 7A). As shown, light 712 from the artificial light source 702 and natural light 3 supplied by the source of daylight (e.g., solar tube 700) mix in a mixing chamber 710 prior to being emitted into an illuminated space 4, e.g., an interior space of a building (not shown).

By mixing light supplied by the artificial and natural light sources in this way, light from all sources is mixed (e.g., in a component of the solar-tube 700 itself) prior to leaving a common outlet, such as a diffuser 708. This can give the impression that all of the light radiating from the outlet originated from a single source. It can also eliminate or address any problems associated with the perceptible color difference between the natural light and the artificial light.

Figure 8:
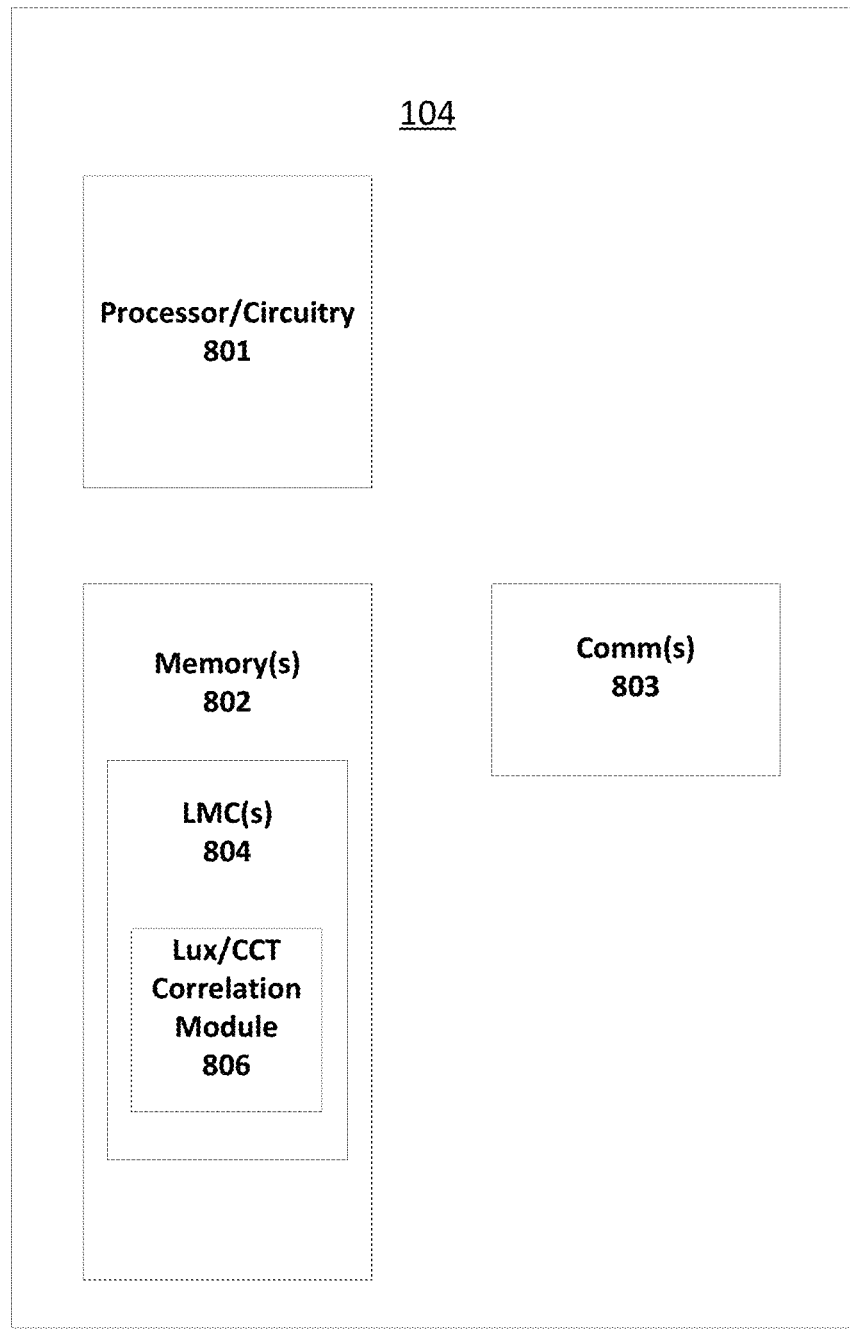
FIG. 8 generally depicts one embodiment of a color-tunable light source controller, in accordance with the present disclosure.

Color-tunable light source controller 104 may be any suitable lighting controller, and may be integral with or separate from the light sources and/or drivers described herein. In any case, color-tunable light source controller 104 may be any controller including suitable processing, memory, and communication resources to perform the controller operations described herein. In this regard, reference is made to FIG. 8, which depicts an exemplary controller consistent with the present disclosure. As shown, color-tunable light source controller 104 may include processor/circuitry 801, memory 802, and communications interface (Comms) 803.

Processor/circuitry 801 may be any suitable type of processor, such as a general purpose processor, a desktop processor, a mobile processor, a server processor, an application specific integrated circuit, combinations thereof and the like. In some embodiments, processor/circuitry 801 is a general purpose processor.

Memory 802 may be any suitable type of computer readable memory. For example, memory 802 may include one or more of the following types of memory: semiconductor firmware memory, programmable memory, non-volatile memory, read only memory, electrically programmable memory, random access memory, flash memory (which may include, for example, NAND or NOR type memory structures), magnetic disk memory, and/or optical disk memory. Additionally or alternatively, memory 802 may include other and/or later-developed types of computer-readable memory. In some embodiments, memory 802 can be local to processor 801 or local to another embedded processor (not shown) within color-tunable light source controller 104.

Comms 803 may include hardware (i.e., circuitry), software, or a combination of hardware and software that is configured to allow color-tunable light source controller 104 to transmit control signals to one or more light sources (or drivers thereof), and to receive signals (e.g., feedback signals) from one or more sensors (such as, but not limited to, lux sensors 8). Accordingly, Comms 803 may be configured to permit transmission and/or receipt of signals using wired and/or wired communications, e.g., with a predetermined communications protocol. Comms 803 may therefore include hardware to support such communication, e.g., one or more transponders, antennas, BLUETOOTH™ chips, WiFi chips, personal area network chips, near field communication chips, combinations thereof, and the like.

Color-tunable light source controller 104 may include lighting control module (LCM) 804. For the sake of illustration, LCM 804 is illustrated as being stored on memory 802. It should be understood that such illustration is exemplary, and LCM 804 may be provisioned in another memory or as a standalone module. In any case, LCM 804 may include computer readable instructions which, when executed by a processor (e.g., processor/circuitry 801), cause color-tunable light source controller 104 to perform lighting control operations consistent with the present disclosure.

Color-tunable light source controller 104 may include Lux/CCT correlation module 806. For the sake of illustration, Lux/CCT correlation module 806 is illustrated as being stored on memory 802, and in particular as part of the LCM 804. It should be understood that such illustration is exemplary, and Lux/CCT correlation module 806 may be provisioned in another memory or as a standalone module (e.g., not part of the LCM 804). In any case, Lux/CCT correlation module 806 may include circuitry configured to and/or computer readable instructions which, when executed by a processor (e.g., processor/circuitry 801), are used by the color-tunable light source controller 104 to correlate, at least in part, the lux of the natural light 3 to the CCT of the natural light 3. For example, the Lux/CCT correlation module 806 may include instructions and/or circuitry that defines a linear or non-linear relationship (e.g., function) between lux of the natural light 3 and the CCT of the natural light 3. Alternatively (or in addition), the Lux/CCT correlation module 806 may include a database which may be used to lookup the CCT of the natural light 3 based on, at least in part, the lux of the natural light 3.

Figure 9:
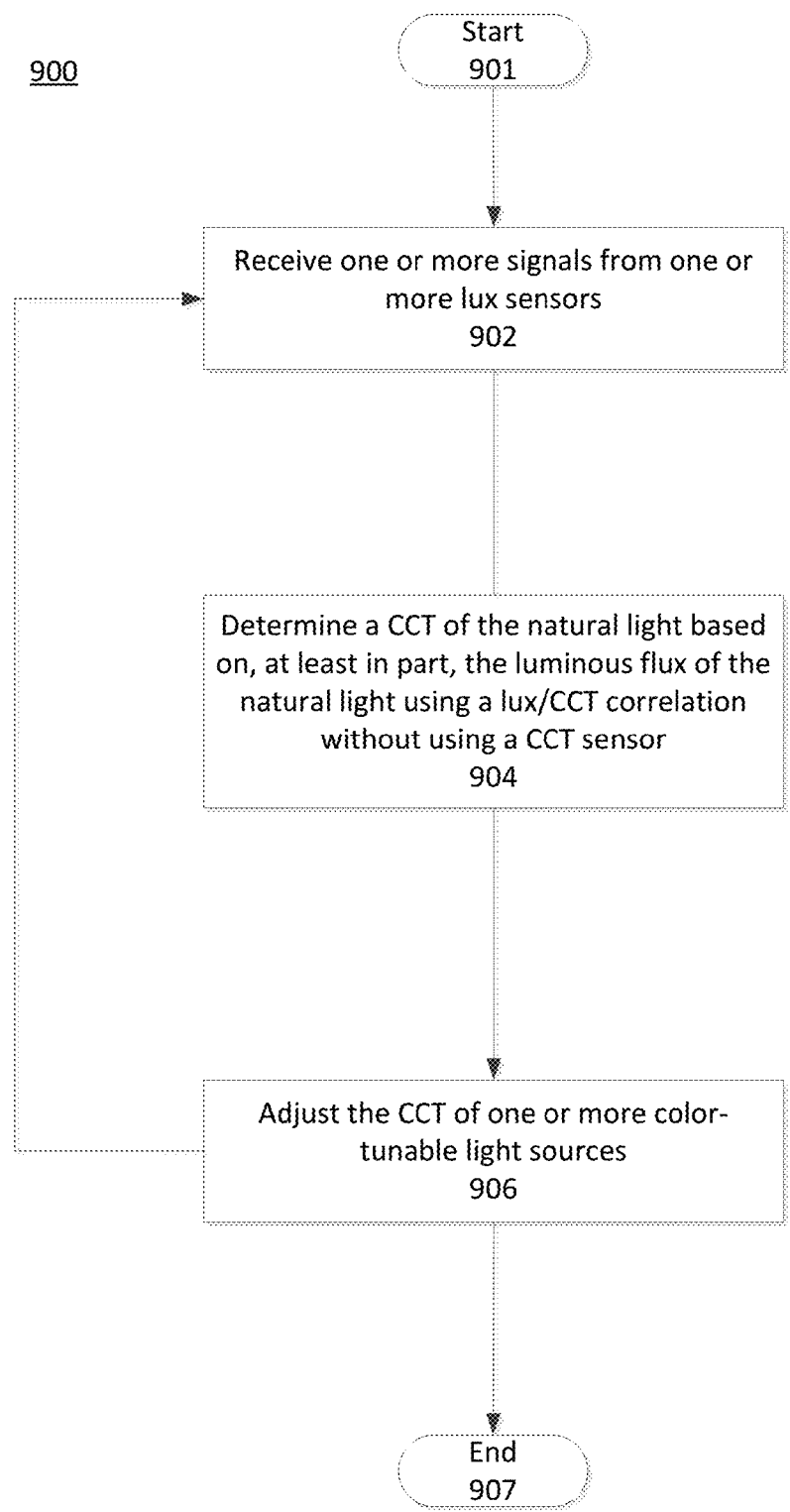
FIG. 9 is a flowchart of an exemplary method for controlling the CCT of a color-tunable light source, in accordance with the present disclosure.

Reference is now made to FIG. 9, which depicts an exemplary method 900 of controlling the CCT of a color-tunable light source 102. As described herein, the method 900 may be performed by one or more color-tunable light source controllers 104. As shown, method 900 begins at block 901. At block 902, the color-tunable light source controller 104 may be configured to receive one or more signals from one or more lux sensors 8, wherein the one or more signals are representative of a luminous flux of natural light 3. The color-tunable light source controller 104 may be configured to determine a luminous flux of natural light 3 in response to, at least in part, the signal(s) from the lux sensor(s) 8. For example, the color-tunable light source controller 104 may receive a signal from one or more lux sensors 8 that corresponds to substantially only the luminous flux of natural light 3, for example, as generally illustrated in FIGS. 3-5.

Alternatively, the color-tunable light source controller 104 may receive one or more signals from one or more lux sensors 8 that correspond to both the luminous flux of the natural light 3 and the luminous flux of the artificial light 7 in the environment 4 (e.g., the mixed luminosity). The color-tunable light source controller 104 may determine the luminous flux of natural light 3 based, at least in part, on the signals from the one or more lux sensors 8d (e.g., the mixed luminosity) and a determined luminous flux of the artificial light 7 in the environment 4. The phrase "at least in part" as used herein is understood to reference that the measurement of the lux of the natural light 3 may be based on solely signals from one or more natural light lux sensors 8a-c or, for example, from one or more mixed luminosity lux sensors 8d and artificial light lux sensors 8n (e.g., subtraction of the artificial light 7 from the mixed luminosity signal) and/or optionally time/date information. For example, the color-tunable light source controller 104 may determine the luminous flux of the artificial light 7 in the environment 4 based on a signal from an artificial lux sensor 8n (i.e., the signal from the artificial lux sensor 8n may directly correspond to the luminous flux of the artificial light 7 in the environment 4). Alternatively (or in addition to the artificial lux sensor 8n), the color-tunable light source controller 104 may determine the luminous flux of the artificial light 7 in the environment/space 4 based on the power supplied to the artificial light source (e.g., color-tunable light source 120). For example, the color-tunable light source controller 104 may directly or indirectly control the power supplied to the artificial light sources/color-tunable light source 120 (e.g., but not limited to, the voltage, current, and/or switching frequency) and/or receive a signal representative of the power supplied to the artificial light source, and as such, may correlate the power supplied to the artificial light source to the luminosity of the artificial light 7.

At block 904, the color-tunable light source controller 104 may be further configured to determine a CCT of the natural light 3 based on, at least in part, the determined luminous flux of the natural light 3. As noted herein, the color-tunable light source controller 104 may be further configured to determine a CCT of the natural light 3 without the use of a CCT sensor. For example, color-tunable light source controller 104 may determine a CCT of the natural light 3 based on, at least in part, the determined luminous flux of the natural light 3 using the correlation (e.g., either linear or non-linear correlation) established by the Lux/CCT correlation module 806. For instance, the color-tunable light source controller 104 may determine the CCT of the natural light 3 based on, at least in part, a correlation between $Lux_{natural}$, $Lux_{sunny}$, $CCT_{natural}$, and $CCT_{sunny}$, and wherein $Lux_{natural}$ is the luminous flux of the natural light 3, $Lux_{sunny}$ is a luminous flux of sunny natural light, $CCT_{natural}$ is the CCT of the natural light 3, and $CCT_{sunny}$ is a CCT of sunny natural light. $Lux_{sunny}$ and $CCT_{sunny}$ may be based on a solar elevation and $Lux_{natural}$ may be determined in response to, at least in part, the output signals (e.g., first control signal) of one of more of the lux sensors 8. It may be appreciated that $Lux_{sunny}$ and $CCT_{sunny}$ may refer to an ideal behavior associated with a sunny day with no clouds or other obstructions.

At block 906, the color-tunable light source controller 104 may be further configured to adjust the CCT of the one or more color-tunable light sources 102 based, at least in part, on the determined CCT of the natural light 3. For example, the color-tunable light source controller 104 may generate (and transmit) an output signal configured to adjust and/or tune the CCT of the color-tunable light source 102. The color-tunable light source controller 104 may optionally adjust the brightness of any of the artificial lights (e.g., but not limited to, the color-tunable light source 102) and/or natural light provider 2 (e.g., but not limited to, adjusting a shutter and/or blinds associated with the natural light provider 2). The color-tunable light source controller 104 may repeat operations 902-906 until the method 900 is terminated at block 907.

According to one embodiment, data may be provided and/or collected related to lux of natural light and the CCT of the natural light, for example, for a given solar elevation angle and for a given time/time range ($q_{sun}(t)$), and may be used to establish the correlation between lux and CCT of the natural light 3. In one example, a correlation between the lux of the natural light 3 and the CCT of the natural light 3 is established by comparing data from a plurality of days to a baseline (e.g., a sunny day baseline). For example, lux data and CCT data are collected for a plurality of sunny days (i.e., $Lux_{sunny}$ and $CCT_{sunny}$) and lux data and CCT data may be collected for a plurality of cloudy days (i.e., $Lux_{cloudy}$ and $CCT_{cloudy}$, also referred to as $Lux_{natural}$ and $CCT_{natural}$, respectively). The differences ($Lux_{natural}-Lux_{sunny}$) and ($CCT_{natural}-CCT_{sunny}$) is determined at each point in time, and this difference is plotted as $D_{CCT}$ vs $D_{lux}$. An example of $D_{CCT}$ vs $D_{lux}$ is generally illustrated in FIG. 10.

As can be seen, the plot of $D_{CCT}$ vs $D_{lux}$ generally shows a linear relationship. While some points deviate from the linear relationship, these outlier data points may correspond to non-ideal moments such as, but not limited to, a cloud in the sunny-day data or data collected with low solar elevation which could be influenced by long shadows. The slope of the line is approximately the same for a plurality of days (e.g., two days), despite the fact that one was primarily blue skies with scattered clouds, and the other was an overcast day with solid cloud cover and only occasional patches of blue sky.

Figure 10:
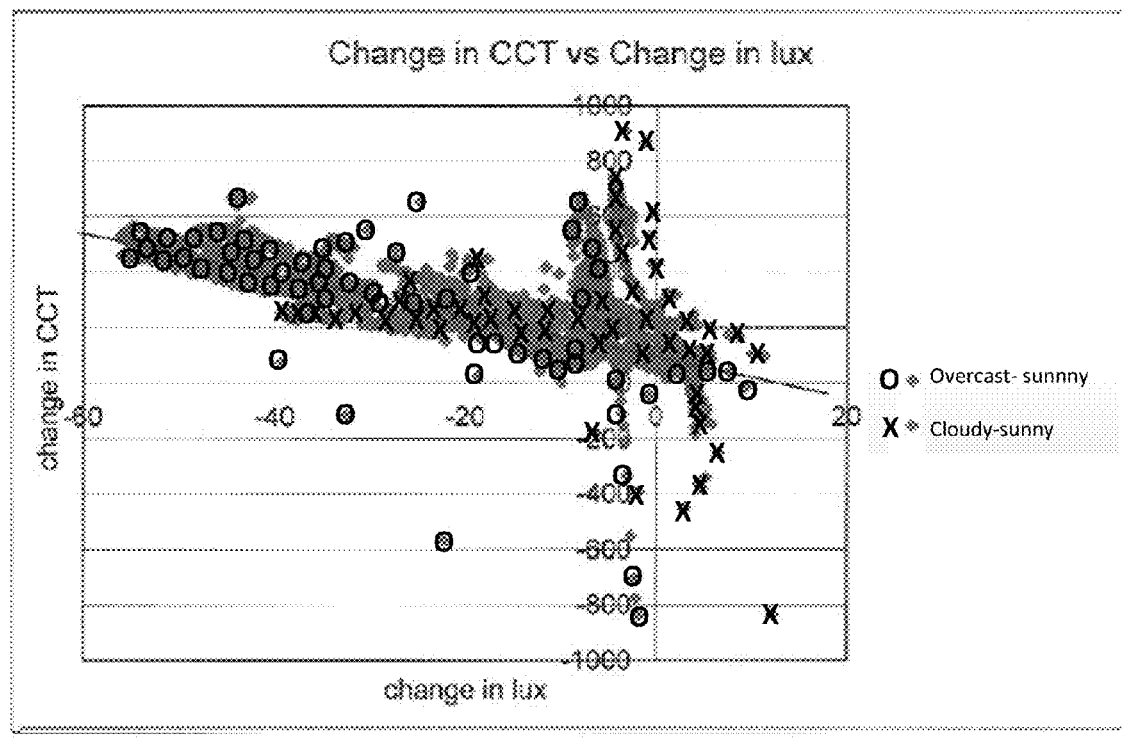
FIG. 10 is a plot of $D_{CCT}$ vs $D_{lux}$, in accordance with the present disclosure.

As shown in FIG. 10, a strong linear relationship (e.g., correlation) between can be determined between lux and CCT (e.g., between $D_{CCT}$ vs $D_{lux}$). As a result, the color-tunable light source controller 104 can determine (i.e., estimate) an expected CCT of the natural light 3 from a measured lux value of the natural light 3, and knowledge of a baseline lux and CCT (e.g., sunny day lux and CCT) in that space.

It should be appreciated, however, that while the plot of $D_{CCT}$ vs $D_{lux}$ generally illustrates a linear relationship, a non-linear relationship between $D_{CCT}$ and $D_{lux}$ may also be established. The use of a non-linear relationship between $D_{CCT}$ and $D_{lux}$ may allow for the user to adjust the overall characteristics of the lighting provided by the CCT tuning lighting system 100 to suit a user's particular preferences (e.g., to make the artificial light slightly warmer, slightly cooler, or the like).

Figure 11:
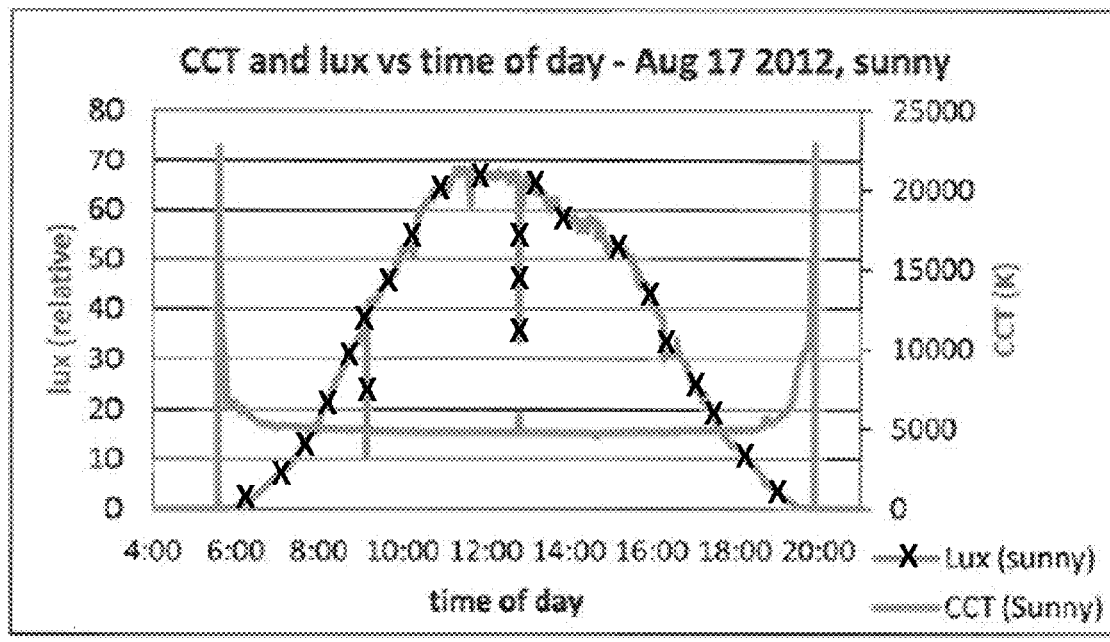
FIG. 11 is a plot of lux and CCT vs time, in accordance with the present disclosure.

The data plotted in FIG. 10 was experimentally collected. In particular, data was collected from a room having tubular skylight with a view of the full sky dome. When the windows of the room are blocked, the tubular skylight is the sole source of illumination. One or more sensors capable of lux and CCT measurements was placed in the room, viewing the floor rather than a direct view of the output diffuser of the skylight, to measure the natural-light illumination. Lux and CCT data was collected for a baseline (e.g., a sunny day) as function of time, an example of which is generally illustrated in FIG. 11. As can be seen, the lux level is a fairly smooth curve that peaks at local noon. At sunrise and sunset, the CCT spikes to very high values (e.g., 25,000K) because the main part of the sky is a very dimly illuminated dark blue; this measurement of the full sky does not match the user's perception, as people primarily view the reddish horizon. Therefore, the natural lighting data is not particularly relevant at these low lux levels; and when constructing a daylight system, the programmed overnight behaviors would typically activate about an hour before sunset and continued until an hour after sunrise because the lux levels are so low. Excluding those time regions, the CCT is around 5000K for most of the day, with excursions only when small clouds pass by (e.g., at around 9:00 and 13:00).

Figures 12, 13:
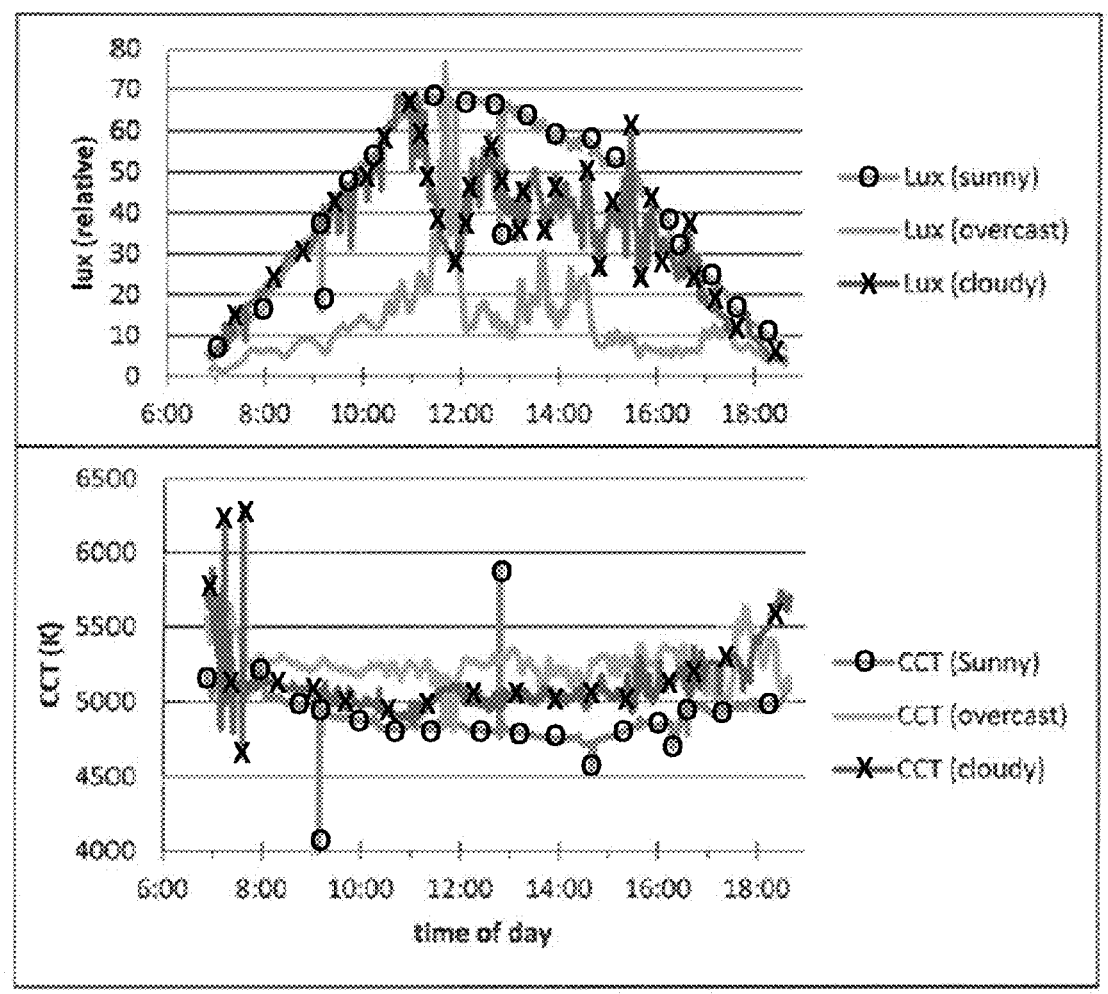
FIG. 12 is a plot of lux vs time for sunny, overcast, and cloudy days, in accordance with the present disclosure.
FIG. 13 is a plot of CCT vs time for sunny, overcast, and cloudy days, in accordance with the present disclosure.

Using this behavior (e.g., sunny day) as a baseline for comparison, data was collected for days with different weather conditions (e.g., clouds). The room was illuminated by sunlight directly, as well as by the blue sky (which is Rayleigh-scatted sunlight). On a partly cloudy day, the scattered sunlight is still predominantly at brightness and wavelengths typical of the blue sky, but the contribution from the direct sun will be switched on and off as clouds pass between the sun and the observer. It is noted that white clouds contribute Mie-scattered light with shifting the wavelength (i.e., the same CCT as direct sunlight), so contribution can be roughly considered in the "direct sunlight" channel. Thus, a cloud dims the lux value and removes the moderate-CCT contribution, increasing the observed CCT. This is the trend that the lux/CCT correlation of the present disclosure utilizes. In FIGS. 12 and 13, data for a partly-cloudy day and a more heavily overcast day are compared to a baseline (e.g., sunny day data).

Referring back to FIG. 10, the slope of the correlation shown in FIG. 10 is −7.125 K/lux, but this is not necessarily applicable to other applications/installations. For example, even for the same location, skylight, and date, a different lux sensor/detector placement may result in a significant change in lux scaling, but not alter CCT measurement. The data and location may influence the lux measurement through changes to the solar elevation angle. BY comparing "today" to the baseline data (e.g., sunny day data) based on solar elevation rather than clock time, this effect may be minimized, as it is expected that the slope is the same at any time of year.

Several different lux sensors/placement and natural light providers (e.g., skylight optics) were also tested, and the slopes are not the same because of the changes to the lux sensor (different lux scales). Because the skylight is azimuthally isotropic (i.e., collects light from north, south, east, and west equally), the seasonal azimuthal variations in solar path do not affect the system, and the baseline output (e.g., sunny day output) can be summarized as a function of solar elevation angle. The lux at a given date and time can be normalized to the peak value (maximum lux at maximum solar elevation, e.g., the summer solstice noon), and the slope of that normalized lux might be expected to be constant for any detector setup.

The CCT tuning lighting system 100 may be calibrated using baseline data (e.g., sunny day data). For example, the data of FIG. 10 establishes a correlation (e.g., linear correlation) between CTT and lux (e.g., between $D_{CCT}$ and $D_{lux}$); the CCT is a calibrated value, but the lux scaling is arbitrary, based on the placement and sensitivity of the lux sensor. The baseline data (e.g., sunny day data) may not be provided as an external calibration, as it may be unique to that lux sensor and that natural light source, measured for the relevant solar angles. Ideally, the baseline data (e.g., sunny day data) may be normalized to peak lux at summer solstice (peak solar elevation angle) to establish a constant slope value.

Sudden changes in lighting may be caused by clouds sunny-day behavior is typified by minimal slope between two adjacent time points. Over a plurality of days (e.g., several days which do not need to be perfectly sunny, but should not be a week of entirely overcast weather), the lux sensor may collect lux data. For each time interval, the values of the minimum slope and maximum brightness are chosen, and assembled into a baseline behavior (e.g., sunny-day behavior). This sunny-day vs. solar elevation trend is used to predict the peak lux value at the summer solstice, which can be used to normalize the lux measurement. As this self-calibration is repeated throughout the year, the baseline solar elevation trend (e.g., sunny-day solar elevation trend) becomes much better defined, and the estimation of the peak value more precise.

While the source of natural light which was used to collect the data above was a tubular skylight with a view of the full sky-dome, the present disclosure can be expanded to other sources of natural light such as, but not limited to, skylights and/or windows which experience shadows and/or a limited field of view.

The source of the CCT vs. lux correlation is the way that natural light is essentially a sum of sunlight at a moderate CCT (e.g., about 5000-5500K) direct from the sun (e.g., essentially a point source), and indirect sky-light (i.e., sunlight which has been Rayleigh-scattered in the atmosphere, with a blue-shifted spectrum), as well as sunlight which has been Mie-scattered by larger particles (such as, but not limited to, humidity or pollution), with a nearly unmodified spectrum.

Figure 14:
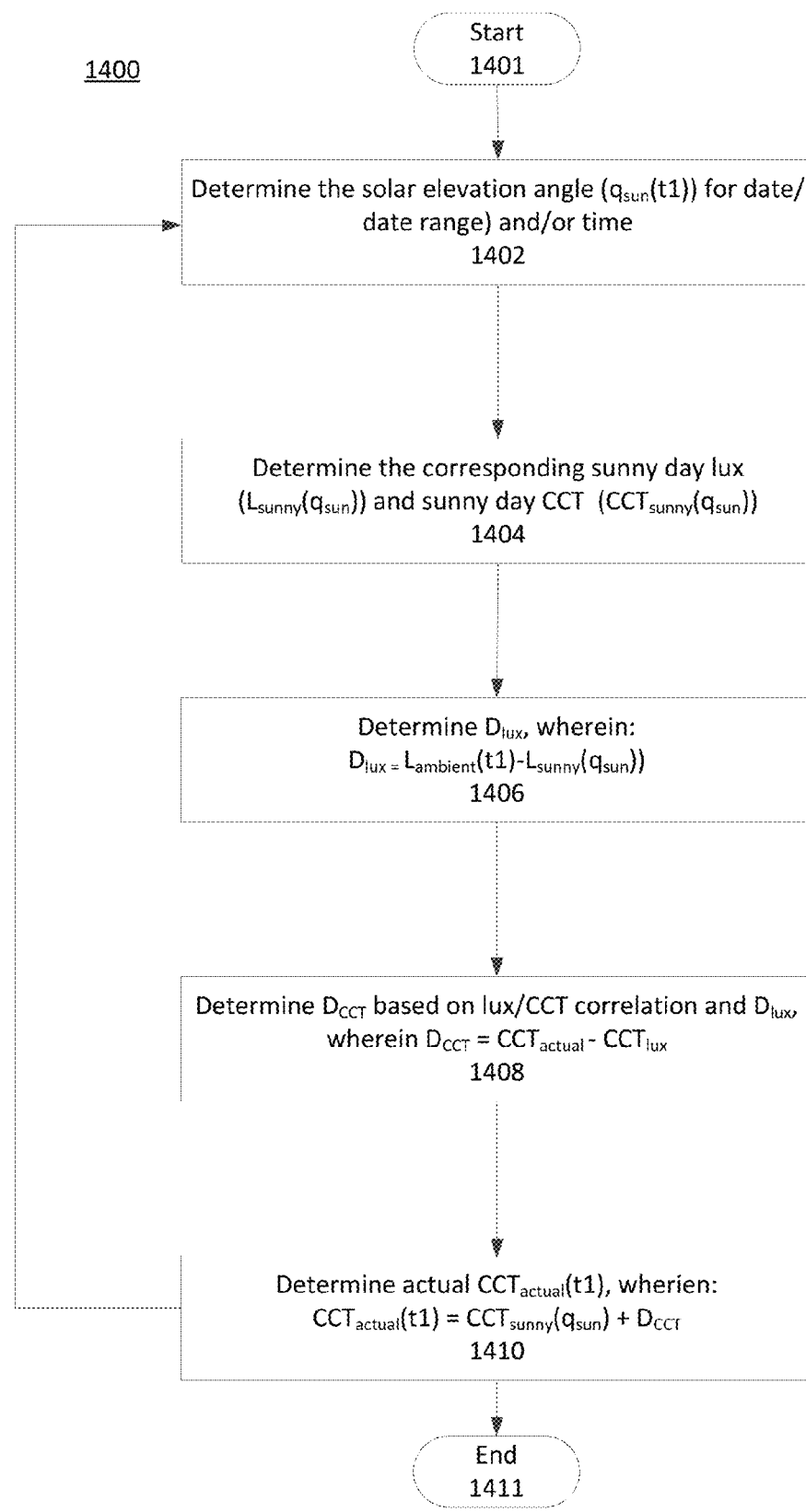
FIG. 14 is another flowchart of an exemplary method for controlling the CCT of a color-tunable light source, in accordance with the present disclosure.

Reference is now made to FIG. 14, which depicts another exemplary method 1400 of controlling the CCT of a color-tunable light source 102. As described herein, the method 1400 may be performed by one or more color-tunable light source controllers 104. As shown, method 1400 begins at block 1401. At block 1402, the color-tunable light source controller 104 may determine (e.g., calculate) the solar elevation angle as described herein. At block 1404, the color-tunable light source controller 104 may determine/lookup the corresponding baseline day lux and CCT (e.g., sunny day lux and CCT), for example, as a function of the solar elevation. The baseline lux and CCT values may be determined as described herein. At block 1406, the color-tunable light source controller 104 determines $D_{lux}$, wherein $D_{lux}=L_{natural}(t1)-L_{sunny}(q_{sun}))$. As may be appreciated, $L_{natural}(t1)$ is the measured lux of the natural light 3 and is based on one or more signals from one or more lux sensors 8 as described herein.

At block 1408, the color-tunable light source controller 104 determines $D_{CCT}$ based on the lux/CCT correlation and $D_{lux}$, wherein $D_{CCT}=CCT_{actual}-CCT_{lux}$. As may be appreciated, $D_{CCT}$ may be determined using a linear and/or non-linear correlation with $D_{lux}$. Alternatively (or in addition), the $D_{CCT}$ may be determined using a lookup table in which a particular value or range of values of $D_{lux}$ may be used to determine/select $D_{CCT}$. At block 1410, the color-tunable light source controller 104 determines the actual CCT of the natural light 3, for example, based on the determined $D_{CCT}$ and the baseline CCT (e.g., sunny day CCT). For instance, the color-tunable light source controller 104 may determine the actual CCT of the natural light 3 using the following relationship: $CCT_{actual}(t1)=CCT_{sunny}(q_{sun})+D_{CCT}$, wherein $CCT_{sunny}(q_{sun})$ is a known value and $D_{CCT}$ is determined based on the lux of the natural light 3. The color-tunable light source controller 104 may repeat operations 1402-1410 until the method 1400 is terminated at block 1411.

As demonstrated above, the CCT tuning listing systems and methods of the present disclosure provide an easy and cost effective mechanism for adjusting the CCT of a color-tunable light source based on the natural light, without the need for a CCT sensor. The CCT tuning lighting systems and methods may be easily retrofitted to existing daylighting systems which have existing lux sensors. While the CCT tuning lighting systems and methods may determine a predicted and/or estimated CCT for the natural light, the determined CCT value is considered to be sufficiently close to the actual CCT of the natural light for purposes of creating artificial daylight and/or simulating the broad dynamics of natural light, and as such, is considered to be the CCT of the natural light for purposes of daylight systems. In many applications, a general knowledge of whether CCT has increased or decreased is sufficient for the tuning of the color-tunable light sources in a meaningful way.

The CCT tuning listing systems and methods may serve as an "artificial skylight," emulating the natural light in real-time. For example, the CCT tuning listing systems and methods may provide supplemental light in the same room as a natural light provider (e.g., skylight), enhancing the dynamics of the natural light, e.g., matching the appearance of the natural light. The CCT tuning listing systems and methods may provide simulated natural light to an interior space. For example, color-tunable light sources on a lower floor would mimic behavior measured on the top floor such that occupants in the lower floor would experience simulated dynamics of daylight as an indicator of current time and weather conditions, even if the room on the lower floor does not have a natural light provider.

The CCT tuning listing systems and methods may compensate the natural light behavior, stabilizing the CCT and lux. In a standard daylight harvesting application, when the lux of natural light dips below a threshold, the artificial light is increased to compensate. According to the present disclosure, the CCT tuning listing systems and methods may also simultaneously adjust the CCT of the artificial light. For example, the CCT tuning listing systems and methods may match the natural light (i.e., high-CCT when a cloud decreases lux), thereby providing an appearance of spatial uniformity across the output diffusers of the natural and artificial light sources, such that the CCT would vary dynamically in time, as an indicator of outside conditions. The CCT tuning listing systems and methods may compensate for the natural light (i.e., low-CCT artificial light when a cloud creates low-lux/high CCT condition in natural light), thereby maintaining a constant CCT on work surfaces, removing time-based fluctuations in the lighting.

The CCT tuning listing systems and methods may be applicable to essentially any daylight-related CCT-tuning scenario which would otherwise require a CCT sensor. For example, the CCT tuning listing systems and methods may be retrofitted into existing daylight-harvesting applications that include only lux sensors.

According to one aspect, the present disclosure features a method of adjusting a correlated color temperature (CCT) of a color-tunable light source. The method comprises receiving, at a controller, one or more signals from one or more luminosity (lux) sensors, the one or more signals representative of a luminous flux of natural light; determining, with the controller, a CCT of the natural light based on, at least in part, the luminous flux of the natural light; and transmitting an output signal from the controller based, at least in part, on the determined CCT of the natural light, the output signal configured to control the CCT of the color-tunable light source.

According to another aspect, the present disclosure features a controller for adjusting a correlated color temperature (CCT) of a color-tunable light source. The controller comprises circuitry to receive one or more signals from one or more luminosity (lux) sensors, the one or more signals representative of a luminous flux of natural light; determine a CCT of the natural light based on, at least in part, the luminous flux of the natural light; and generate an output signal based, at least in part, on the determined CCT of the natural light, the output signal configured to control the CCT of the color-tunable light source.

According to yet another aspect, the present disclosure features a computer system comprising one or more non-transitory computer readable memories which store, in combination or singularly, instructions that, when executed by a one or more computers, cause the one or more computers to perform operations for adjusting a correlated color temperature (CCT) of a color-tunable light source, the operations comprising: determining a luminous flux of natural light ($Lux_{natural}$) in response to, at least in part, at least one signal from one or more luminosity (lux) sensors; determining a CCT of the natural light based on, at least in part, the determined luminous flux of the natural light; and causing an output signal to be generated based, at least in part, on the determined CCT of the natural light, the output signal configured to control the CCT of the color-tunable light source.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The following is a list of reference numeral used in the specification:

1 daylight harvesting system
2 natural light provider
3 natural light
4 space/environment
5 sun
6 artificial light source
7 artificial light
8$a$-8$n$ luminosity (lux) sensor (collectively lux sensor 8)
9 controller
10 daylight system
12 CCT sensor
13 controller
100 CCT tuning lighting system
102 color-tunable light source
104 color-tunable light source controller
106 structure/building
700 solar tube
702 artificial light sources
704 optical conduit
706 dome
708 diffuser
710 mixing chamber
712 mixed light
801 processor/circuitry
802 memory
803 communications interface (comms)
804 lighting control module (LCM)
806 lux/CCT correlation module

What is claimed is:

1. A method of adjusting a correlated color temperature (CCT) of a color-tunable light source, said method comprising:
    receiving, at a controller, one or more signals from one or more luminosity (lux) sensors, said one or more signals representative of a luminous flux of natural light;
    determining, with said controller, a CCT of said natural light based on, at least in part, said luminous flux of said natural light;
    wherein determining said CCT of said natural light is based on, at least in part, a correlation between $Lux_{natural}$, $Lux_{sunny}$, $CCT_{natural}$, and $CCT_{sunny}$, and wherein $Lux_{natural}$ is said luminous flux of said natural light, $Lux_{sunny}$ is a luminous flux of sunny natural light, $CCT_{natural}$ is said CCT of said natural light, and $CCT_{sunny}$ is a CCT of sunny natural light; and
    transmitting an output signal from said controller based, at least in part, on said determined CCT of said natural light, said output signal configured to control said CCT of said color-tunable light source.

2. The method of claim 1, wherein $Lux_{sunny}$ and $CCT_{sunny}$ are values based on a solar elevation and $Lux_{natural}$ is determined, with said controller, in response to, at least in part, said one or more signals from said one or more lux sensors.

3. The method of claim 1, wherein determining said CCT of said natural light is based on a linear correlation between $Lux_{natural}$, $Lux_{sunny}$, $CCT_{natural}$, and $CCT_{sunny}$.

4. The method of claim 1, wherein determining said CCT of said natural light is based on a non-linear correlation between $Lux_{natural}$, $Lux_{sunny}$, $CCT_{natural}$, and $CCT_{sunny}$.

5. The method of claim 1, further comprising determining said luminous flux of natural light, wherein determining said luminous flux of the natural light comprises receiving said one or more signals from said one or more lux sensors, wherein at least one of said one or more signals from said one or more lux sensors corresponds to substantially only said luminous flux of natural light.

6. The method of claim 1, further comprising determining a luminous flux of an artificial light in an environment, wherein at least one of said one or more signals from said one or more lux sensors corresponds to both said luminous flux of natural light in said environment and said luminous flux of said artificial light in said environment, and wherein determining said luminous flux of natural light in said environment is based, at least in part, on said at least one of said one or more signals from said one or more lux sensors and said determined luminous flux of said artificial light in said environment.

7. A controller for adjusting a correlated color temperature (CCT) of a color-tunable light source, said controller comprising circuitry to:
receive one or more signals from one or more luminosity (lux) sensors, said one or more signals representative of a luminous flux of natural light;
determine a CCT of said natural light based on, at least in part, said luminous flux of said natural light; and
generate an output signal based, at least in part, on said determined CCT of said natural light, said output signal configured to control said CCT of said color-tunable light source;
wherein said circuitry determines said CCT of said natural light is based on, at least in part, a correlation between $Lux_{natural}$, $Lux_{sunny}$, $CCT_{natural}$, and $CCT_{sunny}$, and wherein $Lux_{natural}$ is said luminous flux of said natural light, $Lux_{sunny}$ is a luminous flux of sunny natural light, $CCT_{natural}$ is said CCT of said natural light, and $CCT_{sunny}$ is a CCT of sunny natural light.

8. The controller of claim 7, wherein $Lux_{sunny}$ and $CCT_{sunny}$ are based on a solar elevation and $Lux_{natural}$ is determined, by said circuitry, in response to, at least in part, said one or more signals from said one or more lux sensors.

9. The controller of claim 7, wherein said circuitry determines said CCT of said natural light based on a linear correlation between $Lux_{natural}$, $Lux_{sunny}$, $CCT_{natural}$, and $CCT_{sunny}$.

10. The controller of claim 7, wherein said circuitry determines said CCT of said natural light based on a non-linear correlation between $Lux_{natural}$, $Lux_{sunny}$, $CCT_{natural}$, and $CCT_{sunny}$.

11. The controller of claim 7, wherein at least one of said one or more signals from said one or more lux sensors corresponds to substantially only said luminous flux of natural light.

12. The controller of claim 7, wherein said circuitry is further configured to determine a luminous flux of an artificial light in an environment, wherein at least one of said one or more signals from said one or more lux sensors corresponds to both said luminous flux of natural light in said environment and said luminous flux of said artificial light in said environment, and wherein said circuitry determines said luminous flux of natural light in said environment based, at least in part, on said at least one of said one or more signals from said one or more lux sensors and said determined luminous flux of said artificial light in said environment.

13. A computer system comprising one or more non-transitory computer readable memories which store, in combination or singularly, instructions that, when executed by a one or more computers, cause the one or more computers to perform operations for adjusting a correlated color temperature (CCT) of a color-tunable light source, said operations comprising:

determining a luminous flux of natural light ($Lux_{natural}$) in response to, at least in part, at least one signal from one or more luminosity (lux) sensors;
determining a CCT of said natural light based on, at least in part, said determined luminous flux of said natural light; and
causing an output signal to be generated based, at least in part, on said determined CCT of said natural light, said output signal configured to control said CCT of said color-tunable light source;
wherein determining said CCT of said natural light is based on, at least in part, a correlation between $Lux_{natural}$, $Lux_{sunny}$, $CCT_{natural}$, and $CCT_{sunny}$, and wherein $Lux_{natural}$ is said luminous flux of said natural light, $Lux_{sunny}$ is a luminous flux of sunny natural light, $CCT_{natural}$ is said CCT of said natural light, and $CCT_{sunny}$ is a CCT of sunny natural light.

14. The computer system of claim 13, wherein determining said CCT of said natural light is based on a linear correlation between $Lux_{natural}$, $Lux_{sunny}$, $CCT_{natural}$, and $CCT_{sunny}$.

15. The computer system of claim 13, wherein determining said CCT of said natural light is based on a non-linear correlation between $Lux_{natural}$, $Lux_{sunny}$, $CCT_{natural}$, and $CCT_{sunny}$.

16. The computer system of claim 13, wherein at least one of said one or more signals from said one or more lux sensors corresponds to substantially only said luminous flux of natural light.

17. The computer system of claim 13, further comprising determining a luminous flux of an artificial light in an environment, wherein at least one of said one or more signals from said one or more lux sensors corresponds to both said luminous flux of natural light in said environment and said luminous flux of said artificial light in said environment, and wherein determining said luminous flux of natural light in said environment is based, at least in part, on said at least one of said one or more signals from said one or more lux sensors and said determined luminous flux of said artificial light in said environment.

18. A method of adjusting a correlated color temperature (CCT) of a color-tunable light source, said method comprising:
receiving, at a controller, one or more signals from one or more luminosity (lux) sensors, said one or more signals representative of a luminous flux of natural light;
receiving, at said controller, information indicative of a local solar elevation angle at a location of the color-tunable light source;
determining, with said controller, a CCT of said natural light based on, at least in part, said luminous flux of said natural light by correlation of said luminous flux of said natural light to a stored data in said controller generated by measurement of luminous flux values and CCT values corresponding to said local solar elevation angle; and
transmitting, by said controller, an output signal from said controller based, at least in part, on said determined CCT of said natural light, said output signal configured to control said CCT of said color-tunable light source.

19. The method of claim 18, wherein said stored data is based on, at least in part, correlation between $Lux_{natural}$, $Lux_{sunny}$, $CCT_{natural}$, and $CCT_{sunny}$, and wherein $Lux_{natural}$ is said luminous flux of said natural light, $Lux_{sunny}$ is a luminous flux of sunny natural light, $CCT_{natural}$ is said CCT of said natural light, and $CCT_{sunny}$ is a CCT of sunny natural light.

20. The method of claim 19, wherein said stored data is based on a linear correlation between $Lux_{natural}$, $Lux_{sunny}$, $CCT_{natural}$, and $CCT_{sunny}$.

21. The method of claim 18, further comprising determining said luminous flux of natural light, wherein determining said luminous flux of the natural light comprises receiving said one or more signals from said one or more lux sensors, wherein at least one of said one or more signals from said one or more lux sensors corresponds to substantially only said luminous flux of natural light.

* * * * *